(12) United States Patent
Hofmann et al.

(10) Patent No.: US 11,346,636 B2
(45) Date of Patent: May 31, 2022

(54) LONG-RANGE OPTICAL DEVICE, IN PARTICULAR TELESCOPIC SIGHT

(71) Applicant: STEINER-OPTIK GmbH, Bayreuth (DE)

(72) Inventors: Matthias Hofmann, Bayreuth (DE); Peter Haag, Bayreuth (DE)

(73) Assignee: STEINER-OPTIK GmbH, Bayreuth (DE)

( * ) Notice: Subject to any disclaimer, the term of this patent is extended or adjusted under 35 U.S.C. 154(b) by 619 days.

(21) Appl. No.: 16/311,115

(22) PCT Filed: Jun. 14, 2017

(86) PCT No.: PCT/EP2017/064635
§ 371 (c)(1),
(2) Date: Dec. 18, 2018

(87) PCT Pub. No.: WO2018/010908
PCT Pub. Date: Jan. 18, 2018

(65) Prior Publication Data
US 2020/0041228 A1    Feb. 6, 2020

(30) Foreign Application Priority Data

Jul. 13, 2016 (DE) .......................... 102016112879.1

(51) Int. Cl.
*F41G 1/38* (2006.01)
*F41G 1/24* (2006.01)

(52) U.S. Cl.
CPC ................. *F41G 1/38* (2013.01); *F41G 1/24* (2013.01)

(58) Field of Classification Search
CPC .... F41G 1/38; F41G 1/24; F41G 1/16; G01D 5/147; F16H 59/08; G05G 1/105;
(Continued)

(56) References Cited

U.S. PATENT DOCUMENTS 9,172,368 B1   10/2015   Lee
2002/0181840 A1*   12/2002   Laberge ................. G02B 27/60
385/17

(Continued)

FOREIGN PATENT DOCUMENTS

DE    102008023651 A1   11/2009
DE    102013107236 A1   1/2015
EP       2824412 A1   1/2015

*Primary Examiner* — Stephone B Allen
*Assistant Examiner* — Rahman Abdur
(74) *Attorney, Agent, or Firm* — Rimon, P.C.

(57) ABSTRACT

The invention relates to a long-range optical device, in particular telescopic sight, comprising a reticle, the position of which can be adjusted, and comprising an associated mechanism for adjusting the reticle, comprising
- a first magnetic element in the form of a ring magnet,
- a second magnetic element in the form of a bar magnet, motion-coupled to the reticle and movably mounted relative to the first magnetic element, wherein
- a variable magnetic characteristic value is formed as a function of the relative position between the first and the second magnetic element,
- a detection unit, which is configured to detect a change in the magnetic characteristic value formed in the first or second magnetic element,
- a determination unit to determine reticle position information describing the position of the reticle based on a magnetic characteristic value of the first and/or second magnetic element.

18 Claims, 2 Drawing Sheets

Figure 1:
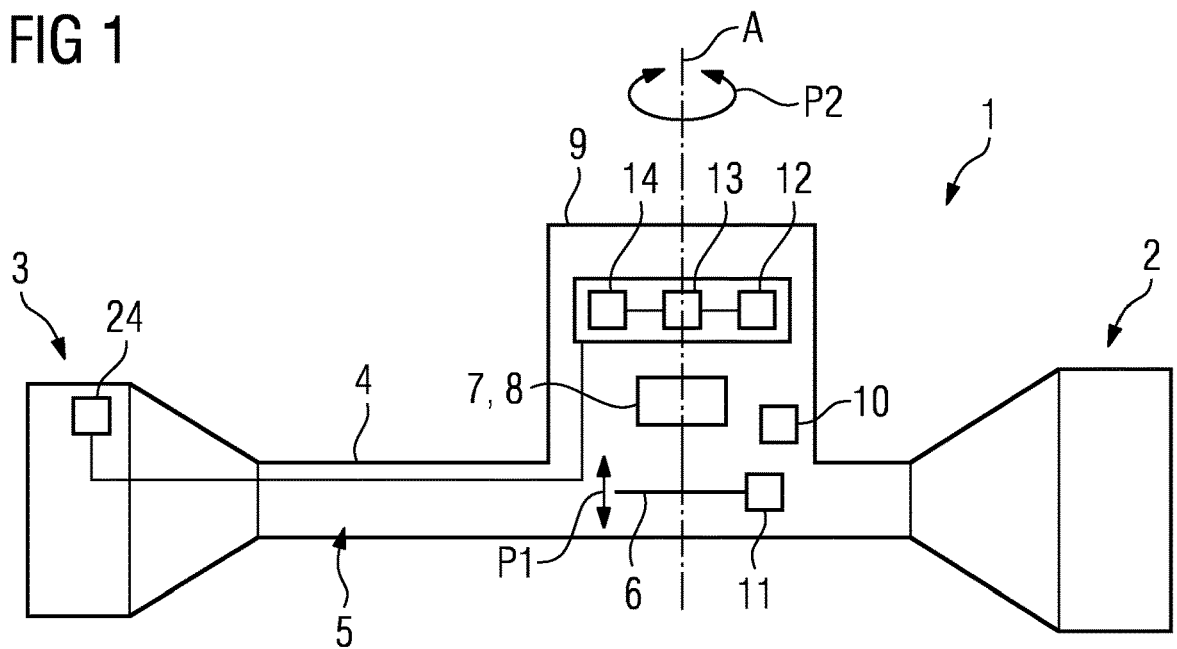

(58) Field of Classification Search
CPC . G05G 1/12; G05G 1/10; B60K 37/06; F16M 11/14; G02B 7/10; E05B 47/0012
USPC .................................................. 359/399–431
See application file for complete search history.

(56) References Cited

U.S. PATENT DOCUMENTS

| | | | |
|---|---|---|---|
| 2010/0249782 A1* | 9/2010 | Durham | A61B 5/06 606/62 |
| 2010/0309756 A1 | 12/2010 | Kimura et al. | |
| 2013/0033746 A1* | 2/2013 | Brumfield | G02B 27/36 359/401 |
| 2014/0115942 A1 | 5/2014 | Plaster | |
| 2015/0362288 A1* | 12/2015 | Sammut | F41G 1/38 235/404 |
| 2016/0040959 A1* | 2/2016 | Davidson | F41G 1/38 42/122 |
| 2016/0164382 A1* | 6/2016 | Moura | H01L 21/67706 310/68 B |
| 2018/0313633 A1* | 11/2018 | Delz | F41G 1/38 |

\* cited by examiner

LONG-RANGE OPTICAL DEVICE, IN PARTICULAR TELESCOPIC SIGHT

CROSS-REFERENCE TO RELATED APPLICATIONS

This application is a United States national stage entry of an International Application serial no. PCT/EP2017/064635 filed Jun. 14, 2017 which claims priority to German Patent Application serial no. 10 2016 112 879.1 filed Jul. 13, 2016. The contents of these applications are incorporated herein by reference in their entirety.

The invention relates to a long-range optical device, in particular a telescopic sight, comprising an adjustable reticle and an associated mechanism for adjusting the reticle.

Long-range optical devices, for instance in the form of telescopic sights, which can be or are mounted on a gun, are known on their merits. Relevant long-range optical devices comprise as substantial constituents several optical elements, which are arranged between an objective and an eyepiece and by which an optical channel is formed. In the optical channel there is typically located a reticle, i.e. a target marker.

The position of the reticle is adjustable and can thus be set to a given shooting situation, i.e. in particular to a given target distance, and an actual point of impact associated with it. When setting or adjusting the reticle, ballistic information, e.g. of the projectile used in each case, is typically also taken into account. For the setting or adjustment of the reticle, a mechanism for adjusting the reticle is associated with this, actuation of which mechanism on the part of the user results in a corresponding adjustment of the reticle.

The exact detection of the position of a reticle is of particular importance for the accuracy. Various principles can be gathered from the prior art for the exact detection of the position of a reticle. These principles are sometimes constructed in a complex manner and could be improved in this respect.

The object of the invention is to specify a long-range optical device, in particular a telescopic sight, which is improved compared with this, comprising an adjustable reticle and an associated mechanism for adjusting the reticle.

The object is achieved by a long-range optical device according to claim 1. The dependent claims to this relate to possible embodiments of the long-range optical device.

The long-range optical device ("device") described herein is e.g. a telescopic sight, which can be or is to be mounted on a gun or firearm, such as e.g. a rifle. The device serves in particular for the optical magnification of objects in the distance that are viewed through this. For this, the device comprises several optical, i.e. in particular optically magnifying, elements arranged between an objective and an eyepiece. The optical elements, which can be e.g. lenses or prisms, form an optical channel.

The device comprises at least one reticle, i.e. a target marker. The reticle is arranged in the optical channel of the device formed by the optical elements. The reticle is (inside the optical channel) adjustable in its position and can thus be set to a given shooting situation, i.e. in particular to a given target distance, and an actual point of impact associated with this. Position adjustment of the reticle should be understood in particular as an adjustment of the horizontal and/or vertical position of the reticle, in particular with regard to a horizontal and/or vertical position starting or reference position.

To adjust the position of the reticle, the device comprises a mechanism associated with the reticle for adjusting the reticle ("adjusting mechanism"). The adjusting mechanism typically comprises at least one setting unit, which is configured to adjust the position of the reticle in at least one, typically vertical or horizontal, setting direction. The setting unit can be formed as a setting mechanism or at least comprise such a setting mechanism.

The substantial constituents of the device, which enable an exact detection of the position of the reticle, are explained below. As results in the following by means of the explanation of the constituents of the device, the detection of the position of the reticle takes place indirectly by way of the detection of the position of a rotatably mounted actuating element, which is motion-coupled to the reticle and is to be actuated by an operator to adjust the reticle. The actuating element can be an adjustment turret. The device can naturally comprise several actuating elements or adjustment turrets. In this case a first adjustment turret can serve to adjust the vertical position of the reticle and a second adjustment turret can serve to adjust the horizontal position of the reticle. The functional principle of detection of the position of the reticle is identical for all adjustment turrets.

Relevant constituents of the device include firstly a first magnetic element, which is magnetisable or magnetic, and a second magnetic element, which is magnetisable or magnetic. The first and/or the second magnetic element can be formed as an energisable electromagnetic element (electromagnet) or as a permanent magnetic element (permanent magnet) or can comprise at least one such element. A group of first magnetic elements and a group of second magnetic elements respectively can naturally also be present.

The second magnetic element is motion-coupled directly or indirectly, i.e. with at least one component or one component assembly connected in between, to the reticle. The second magnetic element is also mounted movably relative to the first magnetic element. The movable mounting of the second magnetic element results from the motion coupling to the reticle. The first magnetic element is typically formed as a ring or ring-shaped; the first magnetic element is therefore typically a ring magnet. The second magnetic element is typically formed bar-like or bar-shaped; the second magnetic element is therefore typically a bar magnet. Starting out from said geometries of the two magnetic elements, the bar-shaped second magnetic element is typically oriented in such a way relative to the annular first magnetic element that its longitudinal axis is (axially) aligned with the (central) opening in the first magnetic element created by the annular geometry. In this case the geometries of the two magnetic elements are further coordinated to one another in such a way that the bar-shaped second magnetic element can be moved (axially) through the (central) opening of the annular first magnetic element.

Each magnetic element has certain magnetic characteristic values, i.e. in particular a certain magnetic field. The respective magnetic characteristic values are variable as a function of the relative position between the first and the second magnetic element. In the first and in the second magnetic element there can be or there is thus formed in each case a variable magnetic characteristic value, i.e. in particular a variable magnetic field, as a function of the relative position between the first and the second magnetic element. The two magnetic elements therefore engage in certain magnetic interaction with one another. If the magnetic characteristic value is a magnetic field, this typically exhibits a sinusoidal or sine-shaped progression. Changes in the relative position between the first and the second magnetic element that take place due to movements of the second magnetic element relative to the first magnetic element result, as revealed below, in detectable changes in respective magnetic characteristic values, i.e. in particular in respective magnetic fields.

Furthermore, relevant constituents of the device include a detection unit. The detection unit, which is implemented in hardware and/or software, is configured to detect a change in the magnetic characteristic value that can be formed or is formed in the first or second magnetic element and can, as mentioned, be a respective magnetic field in particular, which change occurs as a function of the relative position between the first and the second magnetic element.

The detection unit can comprise a first detection element, which can be or is associated with the first magnetic element, and a second detection element, which can be or is associated with the second magnetic element. The first detection element is configured to detect a change in the magnetic characteristic value that can be formed or is formed in the first magnetic element, which change occurs as a function of the relative position between the first magnetic element and the second magnetic element. The second detection element is configured to detect a change in the magnetic characteristic value that can be formed or is formed in the second magnetic element, which change occurs as a function of the relative position between the first magnetic element and the second magnetic element. The association of the respective detection elements with the respective magnetic elements typically results from a (spatially) adjacent arrangement; the first detection element is therefore typically arranged adjacent to the first magnetic element, the second detection element is typically arranged adjacent to the second magnetic element. The detection elements can be e.g. magnetic sensors, e.g. in the form of Hall sensors.

Relevant constituents of the device further include a determination unit communicating with the detection unit. The determination unit is implemented in hardware and/or software and, based on a magnetic characteristic value of the first and/or second magnetic element detected by the detection unit and based on a change detected by the detection unit in the magnetic characteristic value of the first and/or second magnetic element, is configured to determine reticle position information describing the position of the reticle. The determination of the reticle position information typically takes place by way of an association of respective magnetic characteristic values of the first and/or second magnetic element detected by means of the detection unit and of any changes in the detected magnetic characteristic values of the first and/or second magnetic element with certain positions and position changes respectively of a rotatably mounted actuating element that is motion-coupled to the reticle and is to be actuated by an operator for adjustment of the reticle.

The determination unit can be configured to determine angular position information based on the magnetic characteristic value of the first magnetic element detected by the detection unit or a change in the value, and to include the angular position information in the determination of the reticle position information. The angular position information describes the angular position (in a rotational plane) with regard to a reference value of the rotatably mounted actuating element that is motion-coupled to the reticle and is to be actuated by an operator for adjustment of the reticle. The detected magnetic characteristic value of the first magnetic element and changes in the same are therefore linked to the angular position (in a rotational plane) and the turning position of the actuating element and are used to determine the angular position and the turning position of the actuating element. The detected magnetic characteristic value of the first magnetic element therefore permits conclusions to be drawn for a given rotational plane about the circumferential position of the actuating element in the rotational plane. Specifically it can be indicated by way of angular position information, for example, that—with regard to a certain rotational plane—following completed turning by e.g. 45° in a certain turning direction, the actuating element is located in a position twisted e.g. by 45° (related to a reference value or a reference position).

The determination unit can further be configured to determine rotational plane position information based on a magnetic characteristic value of the second magnetic element detected by the detection unit or a change in the value, and to use the rotational plane position information in the determination of the reticle position information. The rotational plane position information describes a rotational plane position with regard to a reference value of the rotatably mounted actuating element, which is motion-coupled to the reticle and is to be actuated by an operator for the adjustment of the reticle. The detected magnetic characteristic value of the second magnetic element and changes to the same are therefore used with the rotational plane or the turning plane of the actuating element and to determine the rotational plane or the turning plane of the actuating element. The detected magnetic characteristic value of the second magnetic element therefore permits conclusions to be drawn for a given circumferential position about the rotational plane of the actuating element. Specifically it can be indicated by way of rotational plane position information, for example, that—with regard to a certain angular position—the actuating element is located e.g. in a second rotational plane reached following a complete rotation of the element about an axis of rotation (with regard to a reference value or a reference rotational plane).

Via a data processing overview of the angular position information and the rotational plane position information, a precise statement can be made about the rotational plane (vertical position) and—within this same rotational plane—the angular position (circumferential position) in which the actuating element motion-coupled to the reticle is located. By means of the determination unit the position of the reticle can be deduced from the position of the actuating element on the basis of the given and known motion coupling of the actuating element to the reticle.

The device can further comprise a storage unit communicating with the detection unit and/or the determination unit. Correlation information is stored in the storage unit. The correlation information describes a correlation of certain magnetic characteristic values of the first magnetic element with certain angular positions, related to a reference value, of the rotatably mounted actuating element, which is motion-coupled to the reticle and is to be actuated by an operator for adjustment of the reticle, and a correlation of certain magnetic characteristic values of the second magnetic element with certain rotational plane positions of the rotatably mounted actuating element, which is motion-coupled to the reticle and is to be actuated by an operator for adjustment of the reticle. Suitable correlation information can be present in data form, e.g. in the form of a look-up table. The computing effort to determine the exact position of the actuating element and of the reticle can be simplified by suitable correlation information. Likewise suitable correlation information can be appropriate if reciprocal (magnetic) influencing of the magnetic elements, e.g. in the absence of a suitable (magnetic) shielding of the magnetic elements, cannot be excluded (to the desired extent). Here also the correlation information facilitates a correlation of respective magnetic characteristic values of the magnetic elements with certain angular positions or rotational plane positions.

The device can comprise an output unit, which is configured for the acoustic and/or optical and/or haptic output of determined reticle position information and if applicable of other information. An output unit for the output of acoustic information can comprise a sound output unit, an output unit for the output of optical information can comprise a display unit, e.g. in the form of an OLED display, an output unit for the output of haptic information can comprise a vibration unit. For an output unit for the output of optical information, it is the case that this is suitably integrated into the optical channel of the device. In proper handling of the device, i.e. when looking through an optical channel, a user can therefore recognise, apart from the object actually optically viewed or magnified, also the output unit and the information that is output optically via this.

Suitable arrangement possibilities of the described constituents of the device are explained below:

The second magnetic element can be arranged or formed on or in a component of the adjusting mechanism that is motion-coupled to the reticle. The component is typically a component of the setting unit or mechanism associated with the adjusting mechanism for adjusting the reticle.

The setting unit or mechanism typically comprises two interacting constituents for adjusting the reticle.

A first constituent of the setting unit can form the component that is motion-coupled to the reticle. The component is typically formed in this case as a setting element that is mounted to be linearly movable. The setting element can comprise a shaft-like setting section, in particular with a front (free) end, that is movable towards the reticle. An adjustment of the reticle can consequently take place due to a movement of the setting section towards the reticle, which movement takes place if applicable against a reset force formed by a suitable reset element, e.g. a spring. The second magnetic element can be arranged or formed on or in the setting section.

A second constituent of the setting unit can be formed by a rotatably mounted transmission element, which is connected non-rotatably to the rotatably mounted actuating element already mentioned, which is to be actuated by an operator to adjust the reticle. The transmission element is coupled to the setting element in such a way that rotary movements of the transmission element can be translated or are translated into linear movements of the setting element, in particular towards the reticle. The coupling between the transmission element and the setting element can be formed by mechanical interaction of threaded elements on the transmission element side and mating threaded elements on the setting element side. The threaded elements on the transmission element side are typically internal thread sections formed in particular in the region of the inner circumference of a hollow cylindrical transmission element section. The threaded elements on the setting element side are typically external thread sections formed in particular in the region of the outer circumference of a shaft-like setting element section.

The first magnetic element can be arranged or formed on or in a non-rotatably mounted section of the adjusting mechanism. In particular, the first magnetic element can be arranged or formed on or in a non-rotatably mounted adapter element of the adjusting mechanism. The adapter element is configured to attach the adjusting mechanism to a mating adapter element on the housing part. The attachment takes place in particular by a (detachable) screw connection.

On a housing part of the device executed in one or several parts, on or in which all of the aforesaid constituents of the device can self-evidently be arranged or formed, there can be arranged or formed at least one connection unit, via which at least one, in particular electronic, functional component couplable to the device can be connected to the device. The device can consequently, in particular as required, be coupled to different external functional components, such as e.g. a target distance measuring unit ("range finder"). The connection unit can comprise a suitable communications interface, which is configured for the transmission, in particular bidirectional transmission (transmitting and/or receiving) of data between the device and a functional component.

Independently of a corresponding communications interface on the connection unit, the device can further comprise a communications unit. The communications unit is configured for the, in particular wireless or radio-based, if applicable data-encrypted, bidirectional transmission of data, e.g. of determined reticle position information, to at least one external communications partner. The communications unit is equipped for this with hardware- and/or software-suitable, in particular radio-based, bidirectional data transmission protocols, which permit e.g. Bluetooth or WLAN communication. The communications unit can be configured to create a radio-based Bluetooth or WLAN connection. An external communications partner can be e.g. another device, a mobile phone, a smartphone, a tablet PC, notebook or a local or global data network, such as an intranet or the Internet.

The communications unit can naturally also be arranged or formed on or in the housing part of the device. However, it is likewise possible that the communications unit, or another communications unit if applicable, is arranged or formed in a housing part separate from the housing part of the device. In this case there is arranged or formed on the housing part of the device a corresponding connection unit, via which the communications unit or another communications unit if applicable can be connected to the device. The principle of a connection unit described above consequently facilitates even the connection on demand of an external communications unit to the device.

The invention is explained in greater detail by means of exemplary embodiments in the drawing figures. Here FIGS. 1-4 show respectively a schematic diagram of a long-range optical device according to an exemplary embodiment.

FIG. 1 shows a schematic diagram of a long-range optical device 1 ("device") according to an exemplary embodiment. The device 1 is shown in a schematic side view in FIG. 1.

The device 1 is a telescopic sight, which can be or is to be mounted on a gun or firearm (not shown), i.e. a rifle, for example, and serves to optically magnify objects or targets viewed through this in the distance. For this the device 1 comprises several optical, i.e. in particular optically magnifying, elements (not shown in greater detail) arranged between an objective 2 and an eyepiece 3. The optical elements, which are e.g. lenses and/or prisms, form an optical channel 5 extending through an elongated, one- or multipiece housing part 4 between the objective 2 and the eyepiece 3.

The device 1 comprises a reticle 6, i.e. a target marker. The reticle 6 is arranged in the optical channel 5 formed by the optical elements. The reticle 6 is (inside the optical channel 5) adjustable in its position and can thus be set to a given shooting situation, i.e. in particular to a given target distance, and an actual point of impact associated with this. A position adjustment of the reticle 6 is understood to mean an adjustment of the horizontal and/or vertical (cf. the vertically aligned double arrow P1) position of the reticle 6, in particular with regard to a horizontal and/or vertical position starting or reference position.

To adjust the position of the reticle 6, the device 1 comprises an adjusting mechanism 7 associated with the reticle 6. The adjusting mechanism 7 comprises a setting unit 8, which is configured to adjust the position of the reticle in a horizontal and a vertical setting direction. As indicated below, the setting unit 8 is formed as a setting mechanism.

The device 1 is configured by way of the constituents explained below for an exact detection of the position of the reticle 6. The detection of the position of the reticle 6 takes place indirectly via the detection of the position of a rotatably mounted actuating element 9, which is motion-coupled to the reticle 6 and is to be actuated, i.e. is to be rotated, as indicated by the double arrow P2, about the turning axis or axis of rotation A by an operator to adjust the reticle 6. The actuating element 9 is an adjustment turret. The adjustment turret depicted in FIG. 1 is used to adjust the vertical position of the reticle 6. The device 1 can self-evidently comprise another adjustment turret for adjusting the horizontal position of the reticle 6. The functional principle of detection of the position of the reticle 6 is identical for all actuating elements 9 or adjustment turrets.

Relevant constituents of the device 1 for the exact position detection of the reticle 6 are a first magnetic element 10, which is magnetisable or magnetic, and a second magnetic element 11, which is magnetisable or magnetic. The magnetic elements 10, 11 are formed as permanent magnetic elements (permanent magnets). It would also be conceivable for at least one magnetic element 10, 11 to be formed as an energisable electromagnetic element (electromagnet).

The second magnetic element 11 is motion-coupled directly or indirectly, i.e. with the connection of at least one component or one assembly in between, to the reticle 6. The second magnetic element 11 is also mounted movably relative to the stationary first magnetic element 10. The movable mounting of the second magnetic element 11 results from the motion coupling to the reticle 6.

The two magnetic elements 10, 11 each have certain magnetic characteristic values, i.e. in particular a certain magnetic field, and engage in certain magnetic interaction with one another. The respective magnetic characteristic values are variable as a function of the relative position between the first and the second magnetic element 10, 11. In the first and in the second magnetic element 10, 11, there can thus be formed or is formed a variable magnetic characteristic value, i.e. in particular a variable magnetic field, as a function of the relative position between the first and the second magnetic element 10, 11. If the magnetic characteristic value is a magnetic field, this typically exhibits a sinusoidal or sine-shaped progression. Changes taking place in the relative position between the first and the second magnetic element due to movements of the second magnetic element relative to the first magnetic element result in, as revealed below, detectable changes in magnetic characteristic values in each case, i.e. in respective magnetic fields in particular.

The device 1 further has a detection unit 12 associated with the magnetic elements 10, 11. The detection unit 12, which is implemented in hardware and/or software, is configured to detect a change in the magnetic characteristic value, in particular in the respective magnetic field, that can be formed or is formed in the first or the second magnetic element 10, 11, which change occurs as a function of the relative position between the first and the second magnetic element 10, 11.

The device 1 further has a determination unit 13, which communicates with the detection unit 12. The determination unit 13, which is implemented in hardware and/or software, is configured to determine reticle position information describing the position of the reticle 6 based on a magnetic characteristic value of the first and/or second magnetic element 10, 11 detected by the detection unit 12 or based on a change detected by the detection unit 12 in the magnetic characteristic value of the first and/or second magnetic element 10, 11. The determination of the reticle position information takes place by way of an association of respective magnetic characteristic values of the first and/or second magnetic element 10, 11 detected by means of the detection unit 12 or of any changes in the detected magnetic characteristic values of the first and/or second magnetic element 10, 11 with certain positions or position changes of the actuating element 9 that is motion-coupled to the reticle 6.

The determination unit 13 is configured to determine angular position information based on the magnetic characteristic values of the first magnetic element 10 detected by the detection unit 12 or a change in these, and to include the angular position information in the determination of the reticle position information. The angular position information describes the angular position (in a rotational plane) with regard to a reference value of the actuating element 9 that is motion-coupled to the reticle 6. The detected magnetic characteristic value of the first magnetic element 10 and changes in the same are consequently linked to the angular position (in a rotational plane) or the turning position of the actuating element 9 and are used to determine the angular position or the turning position of the actuating element 9. The detected magnetic characteristic value of the first magnetic element 10 therefore permits conclusions to be drawn for a given rotational plane about the circumferential position of the actuating element 9 in the rotational plane. It can therefore be indicated by way of angular position information, for example, that—with regard to a certain rotational plane—following completed turning by e.g. 45° in a certain turning direction, the actuating element 9 is located in a position twisted e.g. by 45° (related to a reference value or a reference position).

The determination unit 13 is further configured to determine rotational plane position information based on a magnetic characteristic value of the second magnetic element 11 detected by the detection unit 12 or a change in the value, and to use the rotational plane position information in the determination of the reticle position information. The rotational plane position information describes a rotational plane position with regard to a reference value of the actuating element 9, which is motion-coupled to the reticle 6. The detected magnetic characteristic value of the second magnetic element 11 and changes to the same are therefore used with the rotational plane or the turning plane of the actuating element 9 and to determine the rotational plane or the turning plane of the actuating element 9. The detected magnetic characteristic value of the second magnetic element 11 therefore permits conclusions to be drawn for a given circumferential position about the rotational plane of the actuating element 9. It can thus be indicated by way of rotational plane position information, for example, that—with regard to a certain angular position—the actuating element 9 is located e.g. in a second rotational plane reached following a complete rotation of the element about the axis of rotation A (with regard to a reference value or a reference rotational plane).

Via a data processing overview of the angular position information and the rotational plane position information, a precise statement can be made about the rotational plane (vertical position) and—within this same rotational plane— the angular position (circumferential position) in which the actuating element 9 is located. By means of the determination unit 13 the position of the reticle 6 can be deduced from the position of the actuating element 9 on the basis of the given and known motion coupling of the actuating element 9 to the reticle 6.

The device 1 typically comprises, i.e. not necessarily, a storage unit 14 communicating with the detection unit 12 and the determination unit 13. Correlation information is stored in the storage unit 14. The correlation information describes a correlation of certain magnetic characteristic values of the first magnetic element 10 with certain angular positions, with regard to a reference value, of the actuating element 9, and a correlation of certain magnetic characteristic values of the second magnetic element 11 with certain rotational plane positions of the actuating element 9. The correlation information can be present in data form, e.g. in the form of a look-up table.

By means of the box, not described further, enclosing the detection unit 12, the determination unit 13 and the storage unit 14, it is indicated that the detection unit 12, the determination unit 13 and the storage unit 14 can form parts of a (central) control unit on the device.

The device 1 further comprises an output unit 25, which is configured for the acoustic and/or optical and/or haptic output of determined reticle position information and if applicable of other information. In the exemplary embodiment shown in FIG. 1, the output unit 25 is formed as a display unit, i.e. for the output of optical information. The output or display unit is suitably integrated, e.g. in the form of an OLED display, into the optical channel 5 of the device 1. In proper handling of the device 1, i.e. when looking through the optical channel 5, a user can therefore recognise, apart from the object actually optically viewed or magnified, also the output unit 25 and the information that is output optically via this.

Figure 2:
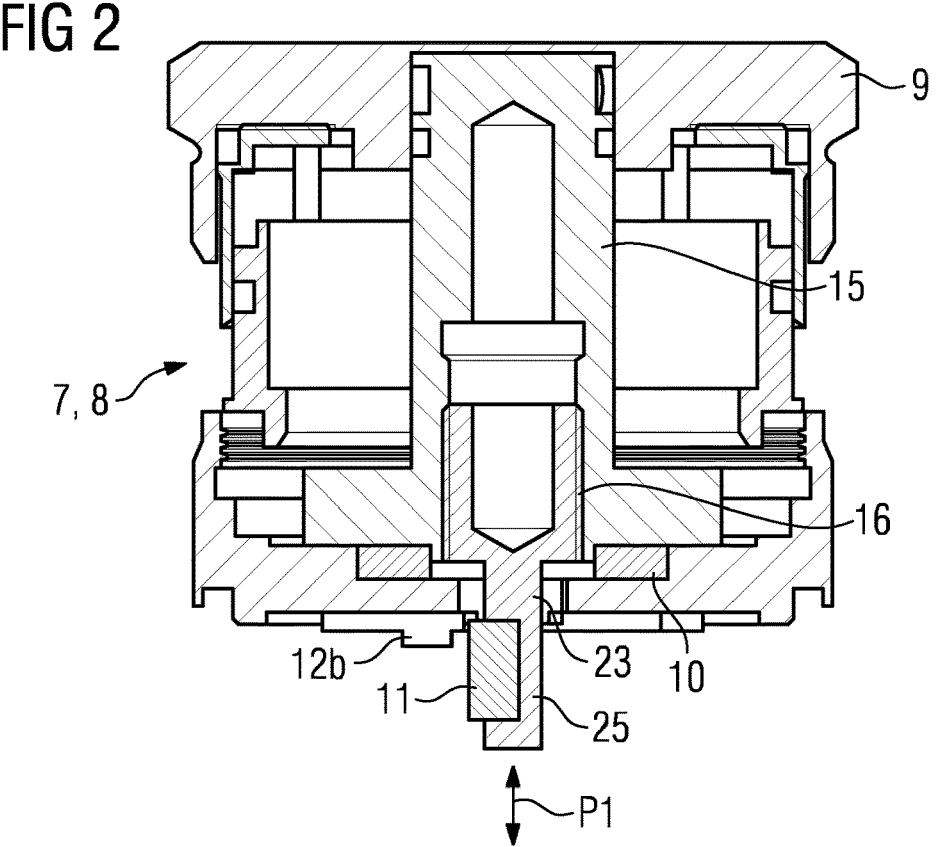
Figure 3:
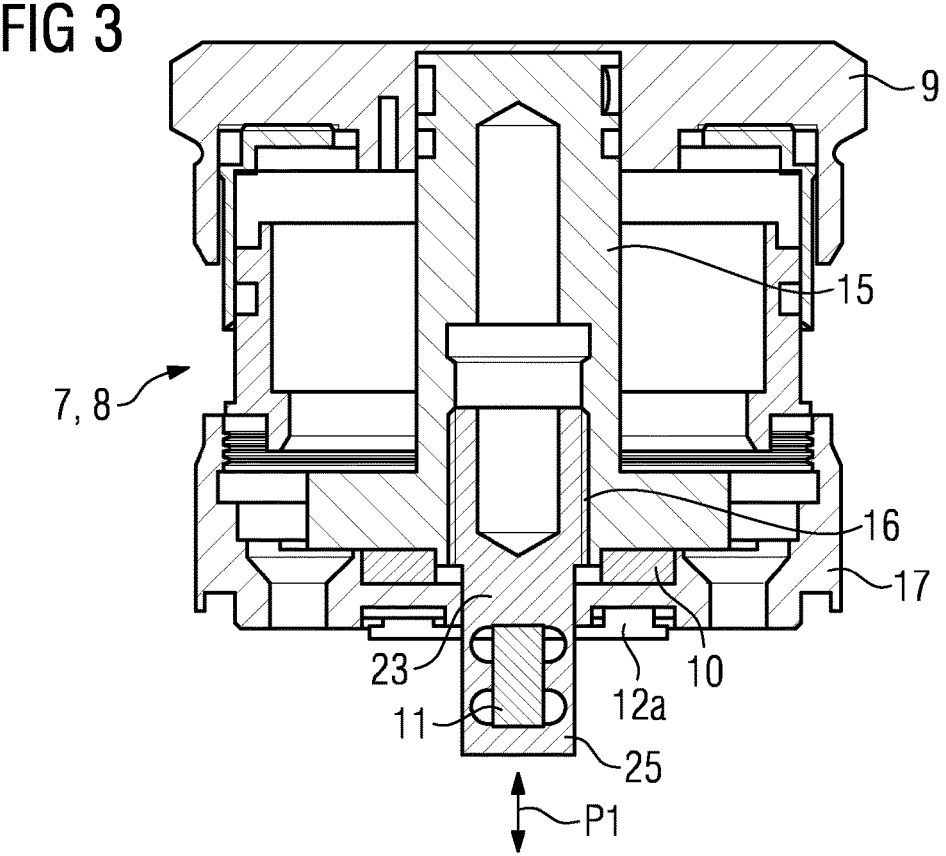

FIGS. 2, 3 show schematic diagrams of another exemplary embodiment of the device 1 in part in the region of the actuating element 9. The device 1 is shown in FIGS. 2, 3 in cutaway views in each case; FIG. 2 is a longitudinal section and FIG. 3 a cross section (rotated by 90° in relation to FIG. 2) through the device 1 in the region of the actuating element 9. Only the constituents of the device 1 relevant for explaining the inventive principle are described in greater detail below.

On the basis of FIGS. 2, 3 it is firstly evident that the first magnetic element 10 can be formed as a ring or ring-shaped and the second magnetic element 11 can be formed bar-like or bar-shaped; in the exemplary embodiment shown in FIGS. 2, 3 the first magnetic element 10 is consequently a ring magnet and the second magnetic element 11 is a bar magnet. The bar-shaped second magnetic element 11 is oriented relative to the annular first magnetic element 10 in such a way that its longitudinal axis is (axially) aligned with the (central) opening (not described) created by the ring-shaped geometry in the first magnetic element 10. The geometries of the two magnetic elements 10, 11 are further so coordinated to one another that the bar-shaped second magnetic element 11 can be moved (axially) through the (central) opening in the annular first magnetic element 10.

On the basis of FIGS. 2, 3 it is further evident that the detection unit 12 can comprise a first detection element 12*a* associated with the first magnetic element 10 and a second detection element 12*b* associated with the second magnetic element 11. The detection elements 12*a*, 12*b* are magnetic sensors, e.g. in the form of Hall sensors. The first detection element 12*a* is configured to detect the change taking place in the magnetic characteristic value formed in the first magnetic element 10 as a function of the relative position between the first and the second magnetic element 10, 11. The second detection element 12*b* is configured to detect the change taking place in the magnetic characteristic value formed in the second magnetic element 11 as a function of the relative position between the first and the second magnetic element 10, 11. The association of the respective detection elements 12*a*, 12*b* with the respective magnetic elements 10, 11 results from the (spatially) adjacent arrangement; the first detection element 12*a* is arranged adjacent to the first magnetic element 10 (cf. FIG. 3), the second detection element 12*b* is arranged adjacent to the second magnetic element 11 (cf. FIG. 2).

Other exemplary arrangement possibilities of the magnetic elements 10, 11 and a constructive assembly of the adjusting mechanism 7 and the setting unit 8 are recognisable on the basis of FIGS. 2, 3.

The second magnetic element 11 is arranged on a component of the adjusting mechanism 7 that is motion-coupled to the reticle 6. The component is a component of the setting unit 8 associated with the adjusting mechanism 7 for adjusting the reticle 6. The component is formed as a setting element 23 that is mounted to be linearly movable. The setting element 23 comprises a shaft-like setting section 25 movable towards the reticle 6 with a front (free) end. The second magnetic element 11 is evidently arranged in the region of the setting section 25.

The setting unit 8 comprises two interacting constituents for the adjustment of the reticle 6. A first constituent of the setting unit 8 is formed by the setting element 23, which is motion-coupled to the reticle 6. An adjustment of the reticle 6 thus takes place due to a movement of the setting section 25 towards the reticle 6, which movement takes place if applicable against a reset force formed by a suitable reset element (not shown), e.g. a spring. A second constituent of the setting unit 8 is formed by a rotatably mounted transmission element 15, which is connected non-rotatably to the actuating element 9. The transmission element 15 is coupled to the setting element 23 in such a way that rotary movements of the transmission element 15 can be translated or are translated into linear movements (cf. double arrow P1) of the setting element 23, in particular towards the reticle 6. The coupling between the transmission element 15 and the setting element 23 is formed by mechanical interaction (thread engagement) of threaded elements (not described in greater detail) on the transmission element side and mating threaded elements (not described in greater detail) on the setting element side. The threaded elements on the transmission element side are internal thread sections formed in the region of the inner circumference of a hollow cylindrical transmission element section 16. The mating threaded elements on the setting element side are external thread sections formed in the region of the outer circumference of the shaft-like setting element section.

It is further evident on the basis of FIGS. 2, 3 that the first magnetic element 10 can be arranged on or in a non-rotatably mounted section of the adjusting mechanism 7. The first magnetic element 10 is arranged here in a non-rotatably mounted adapter element 17 of the adjusting mechanism 7. The adapter element 17 serves to attach the adjusting mechanism 7 to a mating adapter element (not described in greater detail) on the housing part. The attachment is realised in particular by a (detachable) screw connection.

Figure 4:
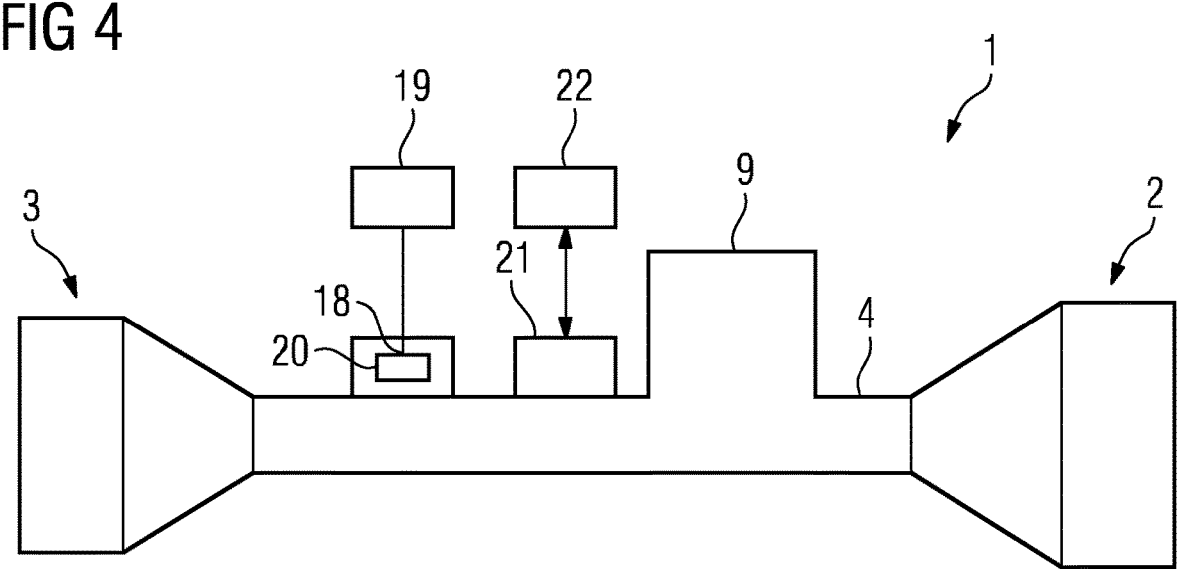

FIG. 4 shows a schematic diagram of another exemplary embodiment of the device 1. The device 1 is shown in FIG. 4 in a schematic side view analogous to FIG. 1.

In addition to the constituents of the device 1 explained in connection with the exemplary embodiment according to FIG. 1, there is arranged or formed on the housing part 5 of the device 1 a connection unit 18, via which one or more, in particular electronic, functional component(s) 19, which can be coupled to the device 1, is or are connectable to the device 1. The device 1 can therefore be coupled as required to different external functional components 19, such as e.g. a target distance measuring unit ("range finder"). The connection unit comprises a communications interface 20, which is configured for the transmission (transmitting and/or receiving) of data between the device 1 and the functional component 19.

Alternatively or in addition to the connection unit 18, the device 1 also comprises a communications unit 21. The communications unit 21 is likewise arranged on the housing part 5. The communications unit 21 is configured for the wireless or radio-based, if applicable data-encrypted, bidirectional transmission of data, e.g. of determined reticle position information, to at least one external communications partner 22. An external communications partner 22 can be e.g. another device, a mobile phone, a smartphone, a tablet PC, notebook or local or global data network, such as an intranet or the Internet. The communications unit 21 is equipped for this purpose with hardware- and/or software-suitable, radio-based data transmission protocols, which permit e.g. Bluetooth or WLAN communication.

Alternatively to the arrangement of the communications unit 21 on the housing part 5, however, it is possible that the or a, if applicable another, communications unit 21 is arranged or formed in a housing part (not shown) separate from the housing part 5. In this case the communications unit 21 can be connected via the connection unit 18 to the housing part 5 and to the relevant electronic constituents of the device 1, i.e. the detection unit 12 and the determination unit 13, for example.

It is the case for all exemplary embodiments that the electrical supply of the electronic constituents of the device 1 are typically supplied with electrical energy via a (rechargeable) electrical energy store (not shown) on the device, i.e. a battery.

Individual, several or all features of the exemplary embodiments shown in the respective figures can be combined with one another in any way.

The invention claimed is:

1. Long-range optical device comprising a reticle that is adjustable in position and an associated device for adjusting the reticle, characterised by
a first magnetic element in the form of a ring magnet, wherein the first magnetic element defines an inner ring space;
a second magnetic element in the form of a bar magnet which is arranged to penetrate the inner ring space and which is motion-coupled to the reticle, wherein the second magnetic element is mounted movably relative to the first magnetic element, wherein there can be formed or is formed in the first and in the second magnetic element in each case a variable magnetic characteristic value as a function of the relative position between the first and the second magnetic element,
a detection unit, which is configured to detect a change in the magnetic characteristic value that can be formed or is formed in the first or the second magnetic element, which change occurs in each case as a function of the relative position between the first and the second magnetic element,
a determination unit, which is configured to determine reticle position information describing the position of the reticle based on a magnetic characteristic value of the first and/or second magnetic element detected by the detection unit or based on a change in the magnetic characteristic value of the first and/or second magnetic element detected by the detection unit.

2. Long-range optical device according to claim 1, wherein the detection unit comprises a first detection element that can be or is associated with the first magnetic element and a second detection element that can be or is associated with the second magnetic element, wherein the first detection element is configured to detect a change in the magnetic characteristic value that can be formed or is formed in the first magnetic element, which change occurs as a function of the relative position between the first magnetic element and the second magnetic element, and the second detection element is configured to detect a change in the magnetic characteristic value that can be formed or is formed in the second magnetic element, which change occurs as a function of the relative position between the first magnetic element and the second magnetic element.

3. Long-range optical device according to claim 1, wherein the determination unit, based on the magnetic characteristic value of the first magnetic element detected by the detection unit or a change in the value, is configured to determine angular position information, which describes the angular position with regard to a reference value of a rotatably mounted actuating element, which is motion-coupled to the reticle and is to be actuated by an operator for the adjustment of the reticle, and to include the angular position information in the determination of the reticle position information.

4. Long-range optical device according to claim 1, wherein the determination unit, based on a magnetic characteristic value of the second magnetic element detected by the detection unit or a change in the value, is configured to determine rotational plane position information, which describes the rotational plane position with regard to a reference value of a rotatably mounted actuating element, which is motion-coupled to the reticle and is to be actuated by an operator for the adjustment of the reticle, and to include the rotational plane position information in the determination of the reticle position information.

5. Long-range optical device according to claim 1, wherein the second magnetic element is arranged or formed on or in a movably mounted component of the device, which component is motion-coupled to the reticle.

6. Long-range optical device according to claim 5, wherein the component is a linearly movably mounted setting element forming a first constituent of a setting unit on the mechanism configured for adjusting the reticle.

7. Long-range optical device according to claim 6, wherein the setting element comprises a shaft-like setting section that is movable towards the reticle, wherein the second magnetic element is arranged or formed on or in the setting section.

8. Long-range optical device according to claim 6, comprising a rotatably mounted actuating element, which is to be actuated by an operator for the adjustment of the reticle, and a rotatably mounted transmission element, which is connected non-rotatably to the actuating element and forms a second constituent of the setting unit on the device, wherein the transmission element is coupled to the setting element in such a way that rotary movements of the transmission element can be translated or are translated into linear movements of the setting element towards the reticle.

9. Long-range optical device according to claim 8, wherein the coupling between the transmission element and the setting element is formed by mechanical interaction of thread elements on the transmission element and mating thread elements on the setting element.

10. Long-range optical device according to claim 1, wherein the first magnetic element is arranged or formed on or in a non-rotatably mounted adapter element of the long-range optical device, which element is configured to attach the mechanism to a mating adapter element of a housing part of the device.

11. Long-range optical device according to claim 1, comprising a storage unit, filed in which is correlation information, which describes a correlation of certain magnetic characteristic values of the first magnetic element with certain angular positions, related to a reference value, of a rotatably mounted actuating element, which is motion-coupled to the reticle and is to be actuated by an operator for the adjustment of the reticle, and a correlation of certain magnetic characteristic values of the second magnetic element with certain rotational plane positions of a rotatably mounted actuating element, which is motion-coupled to the reticle and is to be actuated by an operator for the adjustment of the reticle.

12. Long-range optical device according to claim 1, wherein the first and/or the second magnetic element is formed as a permanent magnetic element or comprises at least one such element or the first and/or the second magnetic element is formed as an electromagnetic element or comprises at least one such element.

13. Long-range optical device according to claim 1, comprising an output unit, which is configured for the acoustic and/or optical and/or haptic output of determined reticle position information and of other information.

14. Long-range optical device according to claim 1, wherein there is arranged or formed on a housing part of the long-range optical device at least one connection unit, via which at least one, in particular electronic, functional component which can be coupled to the long-range optical device, is connectable to the long-range optical device.

15. Long-range optical device according to claim 1, comprising a communications unit, which is configured for the bidirectional transmission of determined reticle position information to at least one external communications partner.

16. Long-range optical device according to claim 15, wherein the communications unit is arranged or formed in the or a housing part of the long-range optical device.

17. Long-range optical device according to claim 16, wherein the communications unit is arranged or formed in a housing part separate from the or a housing part of the long-range optical device, wherein there is arranged or formed on the housing part of the long-range optical device at least one connection unit, via which the communications unit can be connected to the long-range optical device.

18. Long-range optical device according to claim 15, wherein the communications unit is configured to form a wireless Bluetooth or WLAN connection.

\* \* \* \* \*